(12) United States Patent
Lewis

(10) Patent No.: US 7,856,995 B2
(45) Date of Patent: Dec. 28, 2010

(54) METHOD AND APPARATUS FOR COATING FRUIT AND VEGETABLES

(75) Inventor: David K. Lewis, Salmac, CA (US)

(73) Assignee: FreshExpress Incorporated, Salinas, CA (US)

( * ) Notice: Subject to any disclaimer, the term of this patent is extended or adjusted under 35 U.S.C. 154(b) by 1078 days.

(21) Appl. No.: 11/181,959

(22) Filed: Jul. 15, 2005

(65) Prior Publication Data

US 2006/0127537 A1 Jun. 15, 2006

Related U.S. Application Data

(60) Provisional application No. 60/588,512, filed on Jul. 15, 2004.

(51) Int. Cl.
*B08B 3/00* (2006.01)
*A23N 12/00* (2006.01)

(52) U.S. Cl. .................. 134/72; 134/130; 134/131; 99/534; 15/3.14

(58) Field of Classification Search ................ 134/125, 134/25.3, 72, 73, 124, 130, 131, 182, 198; 99/516, 534; 15/3.14, 3.15
See application file for complete search history.

(56) References Cited

U.S. PATENT DOCUMENTS

| | | | |
|---|---|---|---|
| 1,556,472 A | 10/1925 | Bailey | |
| 1,794,751 A | 3/1931 | Beadle | |
| 3,008,838 A | 11/1961 | Brunsing et al. | |
| 3,105,504 A * | 10/1963 | Hirahara | 134/57 R |
| 4,188,768 A * | 2/1980 | Getman | 53/282 |
| 4,767,630 A | 8/1988 | Silver et al. | |
| 5,619,912 A * | 4/1997 | Silbermann | 99/559 |
| 5,775,348 A * | 7/1998 | Rush et al. | 134/72 |
| 5,819,821 A * | 10/1998 | Giacomelli | 141/263 |
| 5,865,217 A * | 2/1999 | Giacomelli et al. | 141/263 |
| 6,626,192 B2 * | 9/2003 | Garcia et al. | 134/25.3 |
| 6,926,015 B2 * | 8/2005 | Garcia et al. | 134/25.3 |
| 7,467,638 B2 * | 12/2008 | Lewis | 134/124 |
| 2001/0047814 A1 * | 12/2001 | Nwoko et al. | 134/25.3 |
| 2002/0170575 A1 * | 11/2002 | Garcia et al. | 134/25.3 |

* cited by examiner

*Primary Examiner*—Joseph L Perrin
(74) *Attorney, Agent, or Firm*—Townsend and Townsend and Crew LLP

(57) ABSTRACT

One embodiment of the present invention includes an apparatus for applying a solution to a product. The apparatus may include a moving conveyor in part forming at least one pocket for receiving product, such as fruit and vegetables. The conveyor may be configured to move the product from a first position to a second position. The apparatus may also include at least one nozzle positioned between the first position and the second position. The at least one nozzle may be configured to deliver the solution into the pocket such that the product is immersed in and sprayed with the solution.

13 Claims, 4 Drawing Sheets

METHOD AND APPARATUS FOR COATING FRUIT AND VEGETABLES

This application claims priority from U.S. provisional patent application Ser. No. 60/588,512, filed Jul. 15, 2004, entitled "FRUIT AND VEGETABLE COATING APPLICATOR," the disclosure of which is incorporated herein, in its entirety, by reference.

FIELD OF THE INVENTION

The present invention relates to preparing fruits and vegetables after harvesting and, more particularly, to method and apparatus for applying a coating to fruits and vegetables.

BACKGROUND OF THE INVENTION

Whole fruit and vegetables have a natural protective coating, called a cuticle, which helps retain moisture and reduce decay. Washing, prior to packaging, removes or weakens the cuticle and the protection it provides causing product quality to degrade and reducing shelf life. As a replacement, the food industry employs edible coatings, primarily waxed or cellulose based, which are applied after washing to offer the same protective benefits as the cuticle. The edible coatings provide numerous benefits, such as maintaining product moisture, reducing bacterial decay, and prolonging shelf life.

Although whole fruits and vegetables remain a staple in the fresh food industry, newly developing markets and customer demand exists for pre-sliced fruits and vegetables which are ready to consume without consumer preparation. While the edible coating protects the exterior of the fruit, once a fruit or vegetable is cut, the exposed interior sections of the fruits and vegetables may be subject to enzymatic browning when some of their cells are severed and exposed during slicing. For example, apples, pineapples, peaches, pears, avocados, strawberries, carrots, and potatoes experience enzymatic browning, adversely affecting their appearance and marketability to a customer.

One method of combating the enzymatic browning includes the blanching process, commonly used in the canned and frozen food industries, which thermally deactivates the enzymes responsible for the enzymatic browning. However, the use of heat in the blanching process adversely affects texture, flavor, and nutritional qualities. As a result the thermal processing is not widely used in the fresh-cut produce industry where preserving natural flavors and textures is often a prime objective.

Alternatively, another form of edible coatings, referred to as anti-browning agents, have become a popular means of controlling enzymatic browning of cut fruit and vegetables. Citric acid, ascorbic acid, and erythorbate acid are examples of commercially available anti-browning agents. Depending on the type of fruit or vegetable to be processed, a solution containing a predetermined amount of anti-browning agents may be used to control enzymatic browning. Additionally, predetermined amounts of calcium, sodium, or other additives may be included in the solution in order to enhance texture. As a result, treating freshly cut slices of fruit and vegetables with a solution containing a small amount of a anti-browning agent, typically about 1-5%, can increase the shelf life of refrigerated packaged fresh-cut produce from a few days to over two weeks.

A commonly used commercial device for coating fruit and vegetable slices includes a trough type vat containing an anti-browning solution. For products that sink to the bottom of the vat, a conveyor belt with protruding paddles, located in the bottom of the vat, transports the slices through the solution. The speed of the conveyor controls the exposure time of the slices to the solution. For products that float, another conveyor with protruding paddles, located over the vat, forces the slices that float into the solution and transports the slices across the vat. Again, the speed of the conveyor controls the exposure time of the slices to the solution.

The fruit and vegetable slices are introduced into the trough at one end, forced through the solution by the conveyors and discharged out the opposite end by conveyor paddles onto a second conveyor where excess solution is drained from the product. Unfortunately, ever though the slices may be fully submerged, uniform exposure of all surfaces is not assured. Often, cut surfaces of fruits and vegetables cling together, forming clumps of slices, which may not dislodge during the coating process. While the conveyor belts and the paddles do contact the slices during the transportation through the vat of solution, the contact fails to provide sufficient agitation to dislodge the slices such that each individual slice moves through the solution independently. As such, surfaces on the inside of clumps of slices may not come into full contact with the solution, resulting in spotty coverage of solution and enzymatic browning on parts of the fruit and vegetable slices.

Furthermore, scrap pieces of fruits and vegetables create organic particles when the product is peeled, cored, and sliced. These organic particles may not be removed during washing and as a result often accumulate in the solution of the vat. Additionally, soluble solids, principally sugars, leach from cut product surfaces and concentrate in the solution. The combination of organic particles and sugars make an excellent growth medium for bacteria. Unfortunately, most antimicrobial compounds are incompatible with the anti-browning agents, making bacteria growth difficult to control without complex and expensive means, such as pasteurization and ultra-filtration. Consequently, expensive sanitary equipment design and strict hygienic operating procedures are required to protect food safety, maintain high product quality levels, and preserve the expensive anti-browning solution. Likewise, coating systems containing large fluid volumes of solution are inherently difficult and costly to maintain.

Therefore, there is a need for a method and apparatus for applying a solution to objects that either both sink or float, with a minimum of charge of treatment solution, with precise control of exposure time to the solution, and with positive product agitation to ensure complete solution exposure to all object surfaces.

SUMMARY OF THE INVENTION

One embodiment of the present invention includes an apparatus for applying a solution to a product. The apparatus may include a moving conveyor in part forming at least one pocket for receiving the product. The conveyor may configured to move the product from a first position to a second position. The apparatus may also include at least one nozzle positioned between the first position and the second position and configured to deliver the solution into the pocket such that the product is immersed in and sprayed with the solution.

In another embodiment of the present invention, a method of applying a solution to a product may include transporting the product from a first position to a second position using a conveyor having a first protruding panel and a second protruding panel. The method may also include positioning at least one of the first panel and the second panel between a first sidewall and a second sidewall such that the first sidewall, the second sidewall, the conveyor, and at least one of the first panel and the second panel defines a hollow and delivering the solution into the hollow from at least one nozzle positioned above the conveyor such that the hollow is substantially filled with the solution. The method may include draining solution from the product.

These and other objects and advantages of the invention will be apparent from the following description, the accompanying drawings and the appended claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

Figure 1:
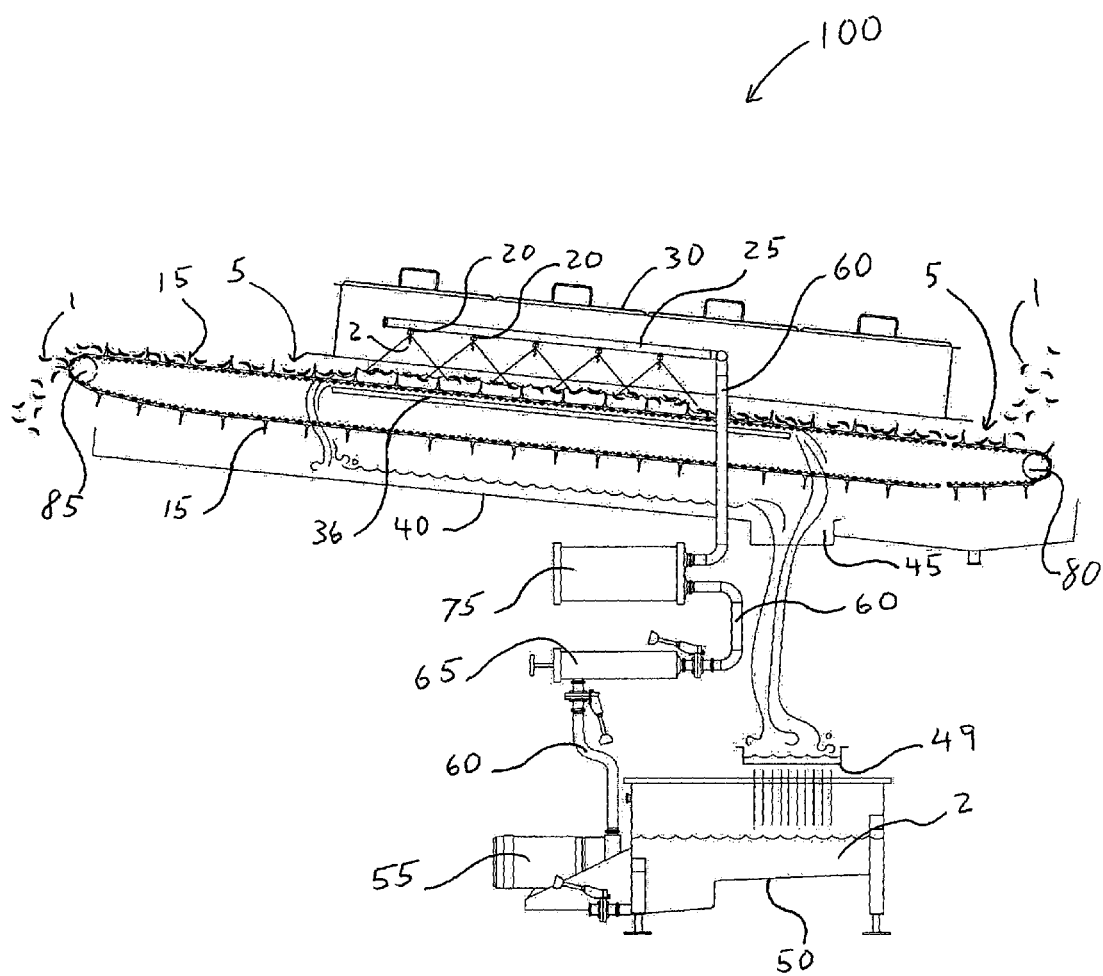
FIG. 1 is a side view of an apparatus for applying a solution according to one embodiment of the present invention.

The present disclosure will now be described more fully with reference to the Figs. in which various embodiments of the present invention are shown. The subject matter of this disclosure may, however, be embodied in many different forms and should not be construed as being limited to the embodiments set forth herein.

One embodiment of the present invention includes a conveyor belt designed to carry fruit and vegetable slices in moving pockets through a spray chamber and an array of sprays. The conveyor belt may include transverse protruding paddles or panels, which in combination with close fitting sidewalls may collect the treatment solution emitted from the sprayers. The sprayers may be located, for example, above the conveyor belt. When passing through the spray chamber, the conveyor belt, the close fitting sidewalls and the paddles form the moving pockets. The conveyor belt may be positioned at an upward angle such that the paddles act as dams to collect solution.

Fruit and vegetable slices may be loaded onto the conveyor belt by conventional means known in the art and passed under the array of sprays and between the sidewalls. Upon the treatment solution substantially filling the pockets on the conveyor belt, objects that have a density greater than the treatment solution sink and become fully emerged in the pockets. Exposed surfaces of objects that float in the treatment solution are inundated with solution discharged from the high-volume low-pressure spray nozzles.

According to one embodiment of the present invention, the high-volume low-pressure spray nozzles may provide a constant agitation, ensuring all surfaces receive a thorough treatment exposure. The spray from the nozzles may be configured and positioned to sufficiently agitate any clumps of fruit or vegetables such that each slice of fruit or vegetable may be dislodged from adjoining slices in order to ensure complete exposure. It should be noted that the spray may also be sufficient to agitate clumps which have sunk to the bottom of the pocket.

Upon exiting the spray chamber, the pockets may empty of treatment solution allowing the removal of excess solution and the transportation of the fruit and vegetable slices for further processing. In one embodiment of the present invention, the treatment solution may simply flow over the sides of the conveyor belt once the close fitting sidewalls are removed. However, in other embodiments, the conveyor belt may include perforations or opens sections in the belt to allow the solution to pass through the belt once the slices have passed through the spray chamber. It is contemplated that the perforations may include approximately 20-40% opens space in the conveyor belt. However, the perforations may be configured to include a smaller or greater percentage of the conveyor belt without deviating from the scope and spirit of the present invention.

In accordance with one embodiment of the present invention, it is contemplated that the perforations in the conveyor belt may be sufficiently sized such that treatment solution will flow through the perforations at a slower rate than the treatment rate of treatment solution provided by the spray nozzles. As such, the solution will pool in the pockets formed by the conveyor belt, the sidewalls, and the protruding paddles. Alternatively, the conveyor belt may pass over a solid flat bed structure while within the spray chamber. The bed structure may obstruct the flow of solution out of the bottom of the conveyor belt allowing the treatment solution to pool in the pockets as described. Once the pockets emerge from the spray chamber, the bed structure may end allowing the solution to drain through the bottom of the conveyor belt.

It is contemplated that the solution may be delivered at such a rate from the spray nozzles that the solution may rise to the top of the protruding paddles. As mentioned, a slight incline or upward angle to the conveyor belt may allow solution to spill over from one pocket to the next, ensuring all pockets are uniformly filled.

Outside the spray chamber the conveyor belt may be supported by narrow carrier ways or supports. The open space between the supports may allow the solution to escape through the conveyor belt perforations and the moving pockets to drain. The drained solution may is directed to a minimum volume reservoir from where a pump circulates it through filters back to the sprays. Fluid contained in the pockets, reservoir, filters, and piping remains in constant suspension with no areas of stagnant fluid present. A high number of filtration cycles are achieved assuring the fluid is preserved in a sanitary and effective state.

As mentioned, the treatment solution may include anti-browning agents and/or additional additives for processing sliced fruit and vegetables. However, it would be apparent to one of ordinary skill that the present invention may be practiced with alternative coatings and with products other than fruits and vegetables. For example, the present invention could be used for any item requiring coating, such as manufactured parts and the like.

Referring to FIG. 1, a side view is shown of a coating apparatus 100 processing fruit and vegetable slices 1 with treatment solution 2. The slices 1 may be loaded onto the conveyor belt 10 such that the slices 1 collect in the pockets 5 between the paddles 15. As shown, the paddles 15 may protrude substantially perpendicular from the conveyor belt 10 and may be configured to extend the entire width of the conveyor belt 10. The pockets 5 may move through the spray chamber 30 such that the pockets 5 and the slices 1 pass beneath the nozzles 20. As shown in FIG. 1, three spray nozzles 20 are employed to inundate the slices 1 with treatment solution 2, however, it should be understood that the number and position of nozzles 20 may vary without deviating from the scope and spirit of the present invention.

It should be understood that during production or coating, slices 1 may be continuously loaded onto the moving conveyor belt 10 and carried by the conveyor belt 10 into the spray chamber 2. The spray nozzles may include full area nozzles positioned such that the conveyor belt 10 within the spray chamber 30 such that the slices 1 and the pockets 5 are inundated with the treatment solution 2.

The nozzles 20 may be supplied with solution 2 by the distribution piping 25 and the supply piping 60. Upon discharge from the nozzles 20, the solution 2 fills the pockets 5 as shown in FIG. 1. At each end of the spray chamber 30, as shown in FIG. 1, the solution 2 may flow through and/or around the conveyor belt 10 and into the catch pan 40. The solution 2 may then be directed into a funnel 45 or other collection means, which empties into a small reservoir 50. Before entering the reservoir 50, the solution 2 may be passed through a sieve 49 in order to collect and remove scrap pieces and large particles. Connected to the reservoir 50, a pump 55 may force the solution 2 through the supply piping 60, which may include a filter 65 and a heat exchanger 75. As shown at the top of FIG. 1, the supply piping 60 returns the solution 2 to the distribution piping 25 such that the solution 2 may be reused and discharged from the nozzles 20. It should be understood that the order, position, and configuration of the fluid recirculating system may be vary without deviating from the scope and spirit of the present invention.

It should be noted that the piping system and reservoirs of the apparatus 100 requires minimal solution 2 in order to fully expose all slices 1 passing through the system. Contrary to the traditional vat systems, small pockets 5 of solution 2 contain a minimal amount of solution yet provides sufficient depth and exposure such that all surfaces of the slices 1 may be exposed to the solution. Furthermore, the small amount of solution 2 held in the catch pan 40 and the reservoir 50 only serve to provide a continuous circulation path for the solution 2 while minimizing the total amount of solution needed. This allows the apparatus 100 to reduce the cost of the expensive solution 2, especially when expensive anti-browning agents and the like are used.

Additionally, the apparatus 100, contrary to the traditional vat systems for coating, may provide continuous movement or flow of the solution 2 through the system of piping and reservoirs. Instead of simply moving the slices through a stagnant vat of solution, the apparatus 100, as shown in FIG. 1, continuously circulates the solution 2 over the slices 1, allowing the solution only to temporarily collect in the reservoir 50. However, the solution 2 may only remain in the reservoir 50 for a short time before being pumped again through the system. By removing any stagnant pools of solution, and by filtering the solution in the filter 65, the apparatus may significantly reduce the likelihood of bacteria growth and improve the product safety and product quality. This may function to reduce the cost and expense of purifying the solution.

The conveyor belt 10 may be driven by a drive pulley 80 and another pulley 85 such that the paddles 15 and the pockets 5 may be continuously revolving and passing under the spray chamber 30. Upon the slices 1 passing through the spray chamber 30, the excess solution 2 may be drained from the slices 1 and the slices may pass to the end of the conveyor belt 10, where they may be collected or carried away on addition conveyor belts (not shown).

Additionally, the conveyor belt 10 may include perforations (not shown) in the belt 10 such that solution 2, and any other fluids by pass through the belt 10. This may allow excess solution 2 to drain from the slices 1 after the solution 2 has been applied. The perforations also act as a draining mechanism for the pockets 5, as shown in FIG. 1 at both ends of the spray chamber 30. To prevent the solution 2 from draining out of the perforations and over the sides of the belt 10, the spray chamber 30 may include a solid bottom wall 36 and solid close-fitting sidewalls 35 (not shown in FIG. 1).

The conveyor belt 10 may be supported on parallel carrier rails or other such supports outside the spray chamber 30. The carrier rails may provide open space between the belt 10 and the catch pan 40, allowing the solution 2 to drain freely through the belt 10. Upon the conveyor belt 10 entering the spray chamber, the conveyor belt 10 may be supported by the bottom wall 36, which may also obstructed the perforations in the conveyor belt 10, forcing the solution to rise in the pockets 5 and creating the pockets 5 of solution 2. Likewise, the sidewalls 35 may act to prevent solution 2 from escaping around the sides of the belt 10 and the paddles 15. Side panel clearances on both sides of the conveyor belt 10 may be small to minimize leakage of fluid around the ends of the paddles 15.

As shown in FIG. 1, the pockets 5 may substantially fill with solution 2 from the nozzles 20 such that a pool of solution 2 fills the pocket 5 between the paddles 15. The height of the paddles 15 and the spacing of the paddles 15 on the belt 10 may be configured to adjust the size and shape of the pocket 5 when filled with solution 2. Although some solution 2 may escape around the paddles 15 and through the belt 10, it would be apparent to one of ordinary skill in the art that the amount of solution 2 discharged from the nozzles 20 may be adjusted such that the amount discharged is sufficient to maintain or exceed the amount of solution 2 escaping.

Additionally, as shown in FIG. 1, the conveyor belt 10 may be positioned at an angle with one end of the conveyor placed at a higher elevation than the other end. This positioning may allow solution 2 to overflow from pocket to pocket, ensuring that each pocket is full of solution 2 for coating each slice 1.

During production, all surfaces on the slices 1 may be either fully submerged in solution 2 or, for surfaces above the surface of the solution 2, may be inundated with solution 2 from spray nozzles 20. For slices 1 with a density greater than the solution 2, the slices may simply be submerged in the solution 2 captured in the pockets 5 and moved through the spray chamber 30 along with the conveyor belt 10.

As would be apparent to those of skill in the art, adjusting the speed of the conveyor belt 10 may control the amount of exposure to the solution 2. In order to increase the exposure time of the slices to the solution 2, the conveyor belt 10 may slowed down. Conversely, in order to decrease the exposure time, the conveyor belt 10 may be sped up. As such, precise control of the exposure of the slices 1 to the solution 2 may be achieved by adjusting the rate at which the conveyor moves the pockets 5 through the spray chamber 30. The precise control may help to maximize efficiency by ensuring consistent and proper exposure to the solution without applying excessive or wasted solution to the slices.

The spray nozzles 20 not only serve to deliver solution 2 to the pockets 5 and the slices 1, but also serve as agitation devices that may be used to separate clumps of slices and ensure complete exposure to individual slices 1. The high-volume low-pressure nozzles may be configured to move large amounts of solution over the slices 1 such that the large volumes of the solution will fall on the surface of the solution pooled in the pockets 5. As a result, the slices 1 may be jostled, causing slices to bump and bounce around in the solution inside the pocket 5. The apparatus 100 may use this deluge of solution to bump and bounce clumps of slices, which may be sticking together, until they separate. Upon separation, each slice may then float or sink independently in the pocket 5.

This separation enhances the quality of the final product by ensuring that all surfaces of each slice receive the correct exposure to the solution.

As described above, excess solution 2 may be drained from the belt 10 and the slices 1 after exiting the spray chamber 30. An air knife or pressurized air (not shown) may be installed underneath the belt to blow air through the belt 10 to help dislodge slices that may sticking to the belt 10. Process retention time is controllable by regulating conveyor belt speed. A heat exchanger 75 can be added to the pump circuit to either heat or cool the solution if required by the process.

Although, in the embodiment shown in FIG. 1, it is contemplated that the belt 10 includes perforations, it should be understood that the present invention may be practiced with different sizes and/or numbers of perforations. In fact, it is contemplated that the belt 10 may even be completely solid without any perforations or openings, allowing the solution to flow over the sides of the belt 10 once the pockets have emerged from the spray chamber 30.

Figure 2:
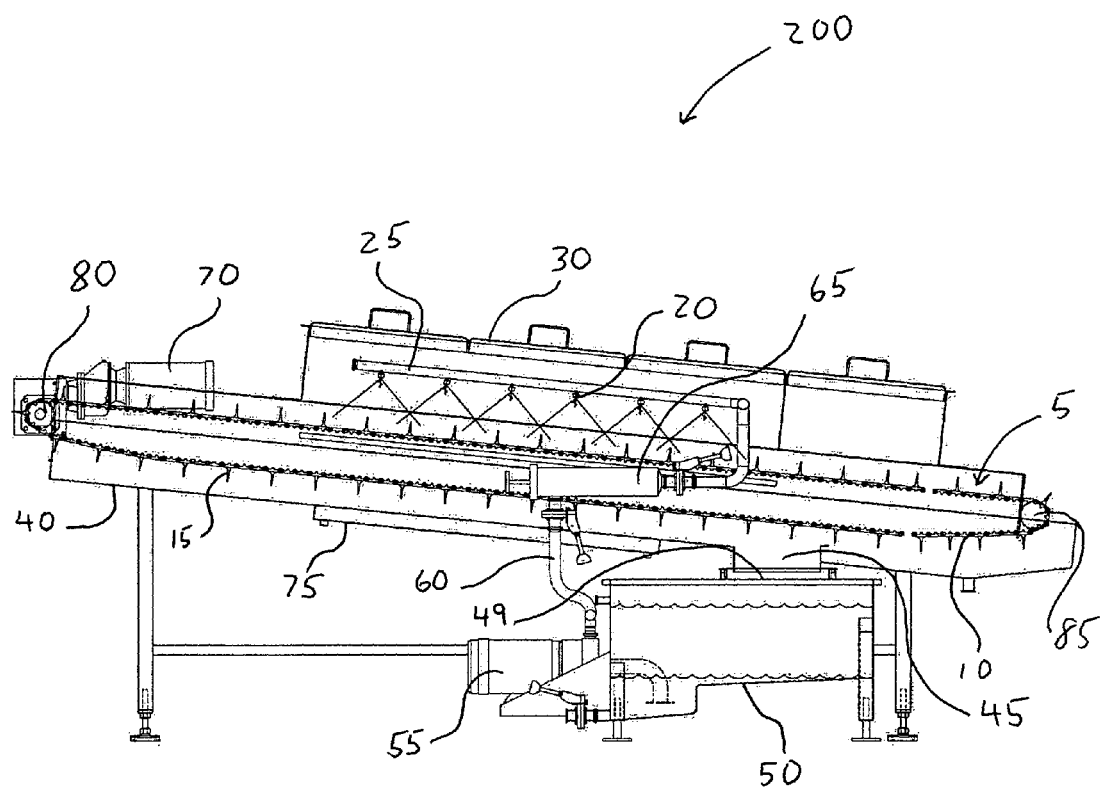
FIG. 2 is a side view of another apparatus for applying a solution according to another embodiment of the present invention.
Figure 3:
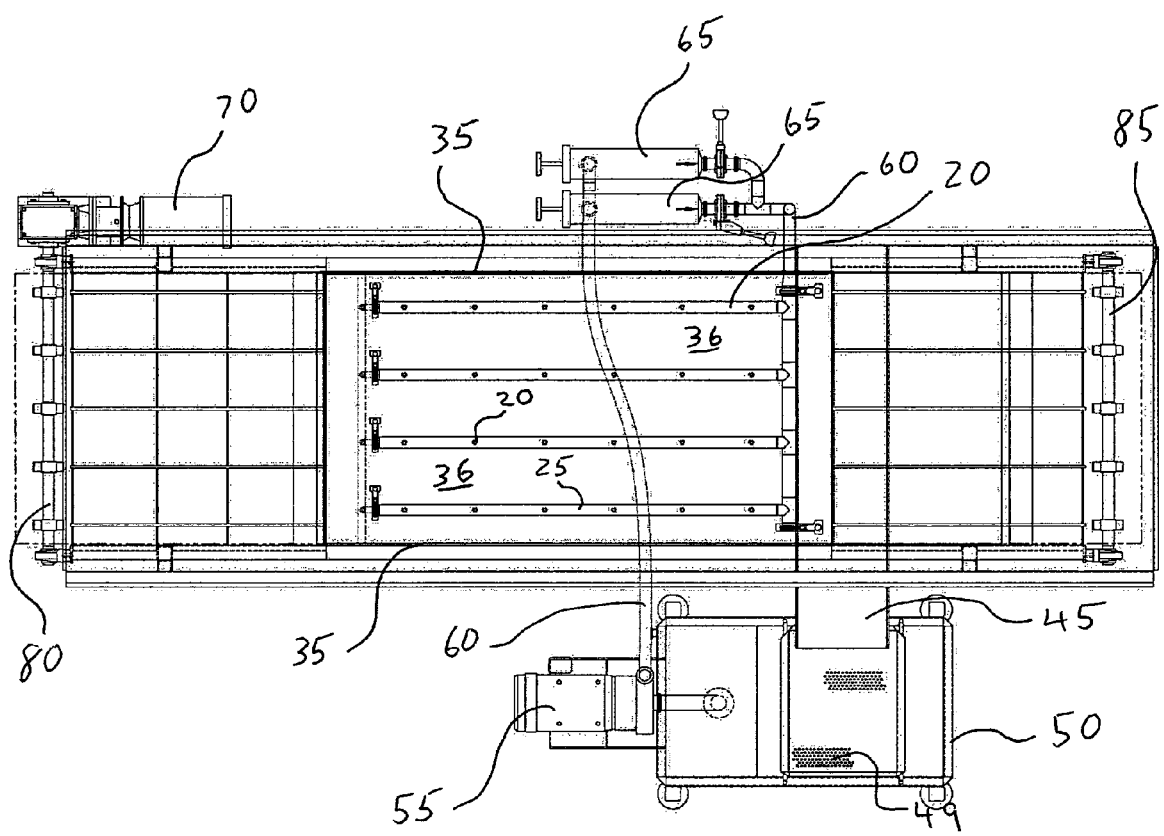
FIG. 3 is a top view of the apparatus of FIG. 2.
Figure 4:
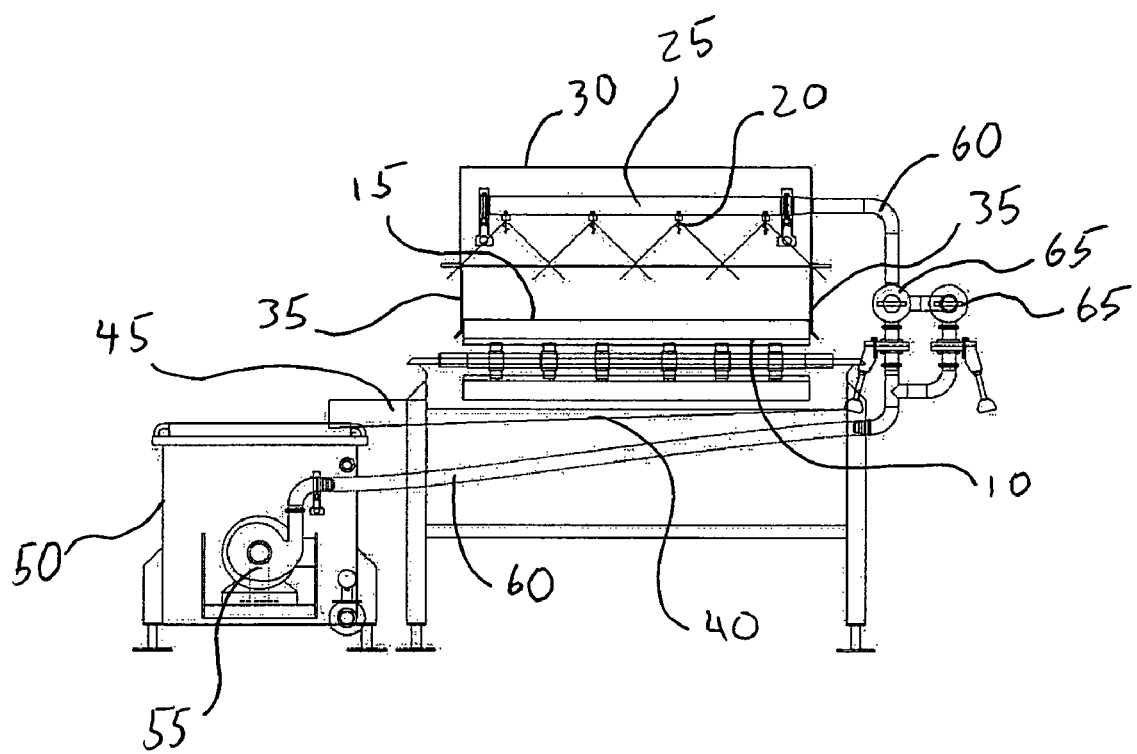
FIG. 4 is an end view of the apparatus of FIG. 2.

Referring to FIGS. 2, 3, and 4, an alternative embodiment 200 of the coating apparatus is shown. Although elements of the apparatus 200 may be alternatively placed or positioned, like elements between the figures have been identically labeled and numbered.

In FIG. 2, a side view of the apparatus 200 is shown. The apparatus 200 may include a conveyor belt 10 with equally spaced protruding paddles 15, which create pockets 5 and functions to transport slices of fruit and vegetables through the spray chamber 30 as described above with reference to FIG. 1. Additionally, the pump 55 is positioned to force solution through the supply piping 60 to a set of filters 65 (shown in FIGS. 3 and 4). The solution may then passed through the distribution piping 25 to the nozzles 20 as discussed above with reference to FIG. 1. However, the heat exchanger 75 may be alternatively mounted to the underside of the catch pan 40. Additionally, a motor 70 is shown in FIG. 2 for driving the drive pulley 80 and the conveyor belt 10.

In FIG. 3, a top view of the apparatus 200 is shown. The filters 65 are shown on the supply piping 60 between the pump 55 and the distribution piping 25. Also, the funnel 45 is shown in FIG. 3 emptying into the top of the sieve 49.

In FIG. 4, an end view of the apparatus 200 is shown. Although, in FIGS. 3 and 4, four distribution pipes 25 distribute solution from the supply piping 60 to the nozzles 20, it should be obvious to one of ordinary skill in the art that various configurations and numbers of distribution pipes 25 may be used without deviating from the scope and spirit of the present invention.

The clearance 16 between the paddle 15 and the sidewall 35 is shown. As discussed above, the clearance 16 may be small in order to minimize the amount of solution escaping out of the pocket 5. However, it should be understood that the size of the clearance 16 may be adjusted and configured depending on solution and the volume of solution discharged by the nozzles 20.

Furthermore, the spray chamber 30 is shown in FIG. 4 enclosing the distribution piping 25 and the nozzles 20. As such, the spray chamber 30 may be configured to enclose the nozzles 20 such that the walls 35 and the top of the chamber 30 may function to direct all solution downward into the catch pan 40 regardless of splashing or sloshing of the solution.

It should understood that the heat exchanger 75 may be used to heat or cool the solution as required by the coating process. It should also be understood that the heat exchanger may be heated with multiple sources of energy and/or heat and should not be considered limited to using heated or cooled water or some other fluid as a working medium. As would be apparent to those of skill in the art, the heat exchanger 75 may also be replaced with gas or electric heaters, or other forms of heating and cooling, without deviating from the scope and spirit of the present invention.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. An apparatus for applying a solution to a product, the apparatus comprising:
   a conveyor belt comprising a plurality of transverse protruding panels in part forming a plurality of pockets configured to continuously receive the product at a loading position and move the product along a length of the conveyor belt to an unloading position where the product is unloaded from the pockets, each of the pockets having at least one opening configured to drain the solution from the pocket; and
   a spray chamber comprising:
      at least one nozzle positioned along the length of the conveyor belt and configured to discharge the solution downwardly into each of the pockets during a movement of the pocket between the loading and unloading positions, and
      at least one of a close fitting sidewall or a close fitting bottom panel configured and positioned along the length of the conveyor belt so as to substantially inhibit drainage of the solution from the at least one opening of each pocket over a first length of travel of the pocket between the loading and unloading positions and so as to not substantially inhibit drainage of the solution from the at least one opening of each pocket over second and third lengths of travel of the pocket between the loading and unloading positions, wherein the first length of travel is disposed between the second and third lengths of travel,
   wherein each of the pockets is substantially drained of the solution during the second and third lengths of travel and collects the solution discharged by the nozzle during the first length of travel so that the pocket becomes substantially filled with the solution thereby coating the products carried in the pocket.

2. The apparatus according to claim 1, wherein the at least one of a close fitting sidewall or a close fitting bottom panel comprises:
   a first sidewall positioned along a first side of the conveyor belt; and
   a second sidewall positioned along a second side of the conveyor belt opposite to the first side of the conveyor belt, the first and second sidewalls being spaced apart substantially the distance of a transverse width of the conveyor belt.

3. The apparatus according to claim 1, wherein the at least one of a close fitting sidewall or a close fitting bottom panel comprises the close fitting bottom panel positioned beneath the conveyor belt.

4. The apparatus according to claim 3, wherein the at least one opening includes a plurality of openings.

5. The apparatus according to claim 1, further comprising a catch pan disposed below the conveyor belt and configured to collect the solution drained from the pockets.

6. The apparatus according to claim 5, further comprising:
a reservoir to receive the solution collect by the catch pan; and
a pump fluidly connected to the reservoir and the at least one nozzle such that the solution from the reservoir is returned to the at least one nozzle.

7. The apparatus according to claim 6, further comprising at least one of a filter and a sieve between the catch pan and the reservoir.

8. The apparatus according to claim 6, further comprising a filter between the pump and the at least one nozzle.

9. The apparatus according to claim 6, wherein the conveyor belt in inclined upwardly from the loading position to the unloading position.

10. The apparatus according to claim 1, wherein the solution includes an anti-browning agent and the product includes slices of at least one of fruits and vegetables.

11. The apparatus according to claim 10, wherein the anti-browning agent includes at least one of citric acid, ascorbic acid, and erythorbate acid.

12. The apparatus according to claim 4, wherein the openings provide 20 to 40 percent open space in the conveyor belt.

13. The apparatus according to claim 1, wherein the at least one nozzle discharges the solution directly into each of the pockets within the first length of travel.

* * * * *